US008869238B2

(12) United States Patent
Gopalakrishna (10) Patent No.: US 8,869,238 B2
(45) Date of Patent: Oct. 21, 2014

(54) AUTHENTICATION USING A TURING TEST TO BLOCK AUTOMATED ATTACKS

(75) Inventor: Rajendra A. Gopalakrishna, Fremont, CA (US)

(73) Assignee: CA, Inc., Islandia, NY (US)

( * ) Notice: Subject to any disclaimer, the term of this patent is extended or adjusted under 35 U.S.C. 154(b) by 1426 days.

(21) Appl. No.: 12/366,902

(22) Filed: Feb. 6, 2009

(65) Prior Publication Data

US 2009/0199272 A1 Aug. 6, 2009

Related U.S. Application Data

(60) Provisional application No. 61/026,733, filed on Feb. 6, 2008.

(51) Int. Cl.
*H04L 29/06* (2006.01)
*G06Q 20/40* (2012.01)

(52) U.S. Cl.
CPC .......... *G06Q 20/4016* (2013.01); *G06Q 20/405* (2013.01); *H04L 63/0838* (2013.01); *G06Q 20/40* (2013.01); *G06F 2221/2133* (2013.01)
USPC ............................................. 726/3; 713/168

(58) Field of Classification Search
CPC .. H04L 63/0838; G06Q 20/40; G06Q 20/405; G06Q 20/4016; G06F 2221/2133
USPC ............................................. 726/3; 713/168
See application file for complete search history.

(56) References Cited

U.S. PATENT DOCUMENTS

| | | | |
|---|---|---|---|
| 7,139,916 B2 | 11/2006 | Billingsley et al. | |
| 7,149,801 B2 | 12/2006 | Burrows et al. | |
| 7,149,899 B2 | 12/2006 | Pinkas et al. | |
| 7,197,646 B2 | 3/2007 | Fritz et al. | |
| 7,200,576 B2 | 4/2007 | Steeves et al. | |
| 7,266,693 B1 | 9/2007 | Potter et al. | |
| 7,908,223 B2* | 3/2011 | Klein et al. | 705/75 |
| 2002/0095569 A1* | 7/2002 | Jerdonek | 713/155 |
| 2006/0287963 A1* | 12/2006 | Steeves et al. | 705/64 |
| 2007/0043681 A1* | 2/2007 | Morgan et al. | 705/67 |
| 2007/0113294 A1* | 5/2007 | Field et al. | 726/27 |
| 2008/0072293 A1* | 3/2008 | D'Urso | 726/4 |
| 2009/0094687 A1* | 4/2009 | Jastrebski et al. | 726/6 |

OTHER PUBLICATIONS

Chang, T. L. "Captcha based one-time password authentication system." Tsung-Lun Chang Master's Thesis, Graduate Institute of Information Engineering, Feng Chia University, Taiwan (2006), 29 total pages.*

* cited by examiner

*Primary Examiner* — Michael Pyzocha
(74) *Attorney, Agent, or Firm* — Vierra Magen Marcus LLP (57) ABSTRACT

System and methods for authenticating a transaction between a user system and a host system are described herein. In one embodiment, the system and methods use a text-reading test (TRT) image as part of the authentication process. The TRT image is presented to the user upon initiation of a transaction by the user. Information provided by a user, via the user system, after perception of the TRT image is compared to the source information in the TRT image. If the user input corresponds to the source information, the user is authenticated and transaction is allowed to proceed.

20 Claims, 5 Drawing Sheets

AUTHENTICATION USING A TURING TEST TO BLOCK AUTOMATED ATTACKS

CROSS-REFERENCE TO RELATED APPLICATIONS

The present disclosure may be related to the following commonly assigned applications/patents:

This application claims priority from U.S. Provisional Patent Application No. 61/026,733 filed Feb. 6, 2008, entitled "AUTHENTICATION USING A TURING TEST TO BLOCK AUTOMATED ATTACKS" which is hereby incorporated by reference, as if set forth in full in this document, for all purposes.

FIELD OF INVENTION

The present invention relates to computer security in general and in particular to authenticating users of a secured system.

BACKGROUND OF THE INVENTION

The internet has grown in popularity enormously over the last 10 years. In addition to the entertainment and information aspect, commercial activity on the internet has grown rapidly over the same period. Commercial activity on the internet usually involves a transaction for buying or selling goods and/or services. Such a transaction often involves transfer of money and/or sensitive personal information in order to consummate the transaction, e.g., passwords, bank account numbers, etc. Due to such exchange of money and/or sensitive personal information, the internet presents a lucrative opportunity for criminals who may defraud people of their money and/or sensitive information by remaining largely anonymous and in many cases transparent to the users. As a result, instances of fraud associated with such transactions are also increasing. For instance, identification theft is one of the fastest growing criminal activities in the on-line world. Moreover, such criminal activities are not limited to the internet, but are equally prevalent in other methods of communication that involve a computer network, e.g., a secured network between a bank and a user. Two of the commonly employed techniques to monitor and intercept communications between two users are Phishing and Man-in-the-Middle (MITM).

Phishing involves the process of attempting to acquire sensitive information such as, usernames, passwords, credit card details, or the like, by masquerading as a trustworthy entity. In a Phishing attack, a user is directed to a "fake" website, whose look and feel are almost identical to a legitimate website that the user believes he/she is accessing. When an unsuspecting user enters his/her personal information on such a "fake" website, that information is misappropriated and later used for conducting criminal activity, e.g., to make unauthorized purchases using the user's credit card, stealing the user's identity, or the like. Phishing may be carried out using e-mail, instant messaging, or other non-real time communication modes.

MITM is a form of active eavesdropping in which the attacker makes independent connections with the victims, e.g., a user and his bank, and relays messages between them, making both the victims believe that they are talking directly to each other over a private connection when in fact the entire conversation is controlled by the attacker. An MITM scheme may involve an attacker positioning himself between the two victims. Both the victims are unaware that there is a third entity monitoring and intercepting their communications. The attacker may then substitute his own messages for the ones sent by either victim. Thus, the attacker may gather sensitive information of both victims and may be able to modify a transaction between the two victims to his advantage. For example, attacker may position himself between a user system and the user's bank system. When the user attempts to conduct a transaction, e.g. transfer money from user's account to receiver A's account, the attacker may intercept this message and modify it to "transfer from user's account to B's account." This modified message may be sent to the bank without the user's knowledge thereby diverting the money to an unauthorized recipient.

A variation of the MITM attack is the Man-In-The-Browser (MITB) attack. In this technique, the attacker resides in the web browser rather than on the network. For example, an MITB may be a malware that may reside either in the user system or in the host system. The MITB may be functionally similar to an MITM.

Several techniques are currently in use to prevent or reduce such phishing and MITM attacks. Many of the current solutions may involve hardware, software, or a combination of both. One solution currently in use is referred to as a two-step authentication process. For example, in a transaction involving an ATM card, the user must possess the actual card and is additionally required to enter a pin number in order to proceed with a transaction. A variation of the two-step approach involves the use of out-of-band confirmation process. In this technique, as a first step, the user initiates a transaction with an entity, e.g., a bank, using a first medium, e.g., internet, and may provide a first authenticating information to the entity, e.g., a password. In the second step, the entity may contact the user over a different communication medium, e.g., Public Switched Telephone Network (PSTN), and may request a second authentication information, e.g., birth date. The transaction is allowed to proceed only when both the first and the second authentication information is verified successfully by the entity. Another technique that may be used in conjunction with the two-step approach described above may involve sending the transaction details to the user and requesting the user to confirm the transaction details. This transaction confirmation may be accomplished using the out-of-band communication method described above or by using the same communication channel being used by the user system and the host system. However, such two-step processes are cumbersome and time consuming. Moreover, they need more resources to implement and hence are cost prohibitive.

Hardware techniques may involve use of devices referred to as smart cards. Smart cards are similar to credit cards but have a microchip embedded in them. The microchip can instantaneously verify the cardholder's identity and any privileges to which the cardholder may be entitled. The cardholder can provide an unique passphrase to generate a one-time password (OTP) to be used for a single transaction. This ensures that even if the password is stolen, it may be not be used again. However, Smart cards can be physically disassembled by using acid, abrasives, or some other technique to obtain direct, unrestricted access to the microchip. Although such techniques obviously involve a fairly high risk of permanent damage to the microchip, they permit much more detailed information to be extracted. Further, the plastic card in which the microchip is embedded is fairly flexible, and the larger the chip, the higher the probability of breaking. Smart cards are often carried in wallets or pockets which presents a fairly harsh environment for a chip. In addition, hardware solutions like the smart card may not be able to detect data tampering since smart cards are not equipped to "understand" the data that they are authorizing or exchanging.

Software solutions involve software smart cards that enable multiple levels of authentication. Software smart cards may use a camouflage technique to make it more difficult for a hacker to get access to the information. However, these solutions have limited applicability and require a high level of technical sophistication on the user side and hence may not be practical for widespread implementation. Moreover, the hardware and software solutions described above may not be able to provide the necessary protection, by themselves, against various types of data security threats such as data tampering, MITM, MITB, Phishing, or the like.

One of the recent techniques, called the reverse turing test, focuses on discerning whether the user on the other end of the network is a computer or a human user. This technique is primarily aimed at preventing automated programs from generating requests and/or deciphering information sent over the network. In order to prevent an automated program, e.g., MITM, from deciphering information over a network, it may be necessary to secure the communication channel over which information is being exchanged. This may be accomplished by ascertaining that the user on the other end is a human and not another automated device, using the reverse turing test.

Turing Test

The turing test was originally employed to test a machine's ability to demonstrate intelligence. A typical implementation of a turing test may involve a human judge engaging in a natural language conversation with one human and one machine, each of which try to appear human. All participants are placed in isolated locations. If the judge cannot reliably tell the machine from the human, the machine is said to have passed the test. In order to test the machine's intelligence rather than its ability to render words into audio, the conversation is limited to a text-only channel such as a computer keyboard and screen.

A variation of the turing test called the Reverse Turing Test is a test wherein a computer system tries to determine whether the user on the other end is a human or another computer. This test is premised on the fact that only a human is able to discern certain information that a computer may not be able to discern. For example, if the user is presented with an image depicting a dog and is asked to submit a textual response to the image, only a human can identify the dog in the graphic and textually respond indicating that he/she sees a dog. A computer however, lacks the intelligence required to discern contents of an image and provide a textual response to a question based on the image. Reverse Turing Tests are being increasingly employed in the field of computer security to prevent execution of automated programs which may have a malicious purpose. One such implementation of the reverse turing test is called Completely Automated Public Turing test to tell Computers and Humans Apart (CAPTCHA). Details about CAPTCHA may be found at http://captcha.net.

Text Reading Test (TRT)

The present application describes an implementation of the reverse turing test, described above, and is referred to as the Text-Reading Test (TRT). A TRT may be in the form of a visual presentation (image), an audio presentation (a sound clip that can be deciphered only by a human), or an audio-visual presentation. In one embodiment, a TRT may be an image with text embedded in it, hereinafter referred to as a TRT image. Further, the embedded text may be distorted so that it may be undecipherable by a computer, but a human reading the text may easily be able to recognize the text in the TRT image. For example, during a communication between a computer system and a user, the computer system may send a TRT image to the user system. The user may be asked to recite back at least a portion of the text or the entire text depicted in the TRT image. If the text recited by the user matches the source text in the TRT image, either exactly or approximately, the computer system may conclude that it is interacting with a human user. Thus a computer system or the like, may discern that the user on other end of the communication channel is a human and not another computer system or an automated device. TRT images may be used to prevent spam email, automated registrations, automated attempts to gain access to secured systems using password variations, or the like. For further information on this topic, see Von Ahn, L., Blum, M., and Langford, J., "Telling Humans and Computers Apart Automatically", *Communications of the ACM, volume 4, issue 2*, February 2004, pp. 56-60.

Various methods of authentication based on the CAPTCHA concept have been proposed.

U.S. Pat. No. 7,266,693 to Potter et al. entitled "Validated mutual authentication", proposes use of fractal images in authentications. In this method, a user selects a fractal image, from among a plurality of fractal images, during an authentication process. In subsequent transactions, the user is required to select that same fractal image, from among a plurality of fractal images, to authenticate her/him.

U.S. Pat. No. 7,200,576 to Steeves et al. entitled "Secure online transactions using a captcha image as a watermark" generally relates to techniques for conducting secure online transactions using CAPTCHA images as watermarks.

U.S. Pat. No. 7,197,646 to Fritz et al. entitled "System and method for preventing automated programs in a network" is generally directed at diminishing the use of automated programs in a networked environment. A server provides a client computer with a visual test upon a request transmitted through a network by the client computer to the server. The visual test requires the client computer to perform a predetermined action on a shaped object displayed on a video display in order to gain access to the server.

U.S. Pat. No. 7,149,899 to Pinkas et al. entitled "Establishing a secure channel with a human user" is generally directed at a method of establishing a secure channel between a human user and a computer application. In this approach, a host system uses a randomly selected identifier to authenticate the user. The randomly selected identifier is in a format that is recognizable to a human but is not readily recognizable by an automated agent. If the user correctly identifies the identifier, the user is granted access to the host system.

U.S. Pat. No. 7,149,801 to Burrows et al. entitled "Memory bound functions for spam deterrence and the like" discloses a method for preventing abuse of a resource on a computer network by use of come memory bound functions.

U.S. Pat. No. 7,139,916 to Billingsley et al. entitled "Method and system for monitoring user interaction with a computer" is generally directed at monitoring interaction between a user and a computer using an image including random reference data readable by the user.

BRIEF SUMMARY OF THE INVENTION

Embodiments of the present invention present a method for authenticating a transaction between a user system and a host system. The method comprises receiving information associated with the transaction from a user system, sending a presentation including information associated with the transaction in a text-reading test (TRT) image format to the user system, and receiving input corresponding to the information included in the presentation form the user system.

Another embodiment of the present invention discloses a method for conducting a transaction between a user system and a host system over a communication channel. The method comprises the user system sending information related to the transaction to the host system, the user system receiving a presentation including information related to the transaction from the host system, the presentation being characterized by a TRT image, and the user system sending text indicative of the information included in the presentation to the host system.

In yet another embodiment, a method for authenticating a user is disclosed. The method comprises a host system sending a presentation including information in a text-reading test format to a user system. The host system receives input, by the user, indicative of the information included in the presentation from the user system. The host system compares information received from the user to the information in the presentation graphic and authenticates the user if the input communicated by the user matches the information in the presentation.

In accordance with yet another embodiment, a user system is provided. The user system comprises a processing unit configured to communicate with the host system, an input device configured to accept input from a user, and a display device configured to display a text-reading test (TRT) image received from the host system.

In another specific embodiment of the present invention, a host system is provided. The host system comprises a processing unit configured to receive a first information from the user system and a graphics generation unit configured to create a presentation. The presentation may include a second information where the second information is based at least in part on the first information. The presentation may include a text-reading text (TRT) image. The host system may also include a comparison unit operable to compare a third information received from the user system to the second information where the third information may be a user response to the second information. The host system may further include an authentication unit configured to authenticate the user if the third information corresponds to the second information.

In yet another embodiment, a presentation graphics is provided. The presentation comprises an image and text information embedded in the image. The text information in the image is manipulated so as to be only recognizable by a human and comprises information related to the transaction. The manipulation of the text may include distorting the text such that only a human can recognize the letters in the text.

The following detailed description together with the accompanying drawings will provide a better understanding of the nature and advantages of the present invention.

DETAILED DESCRIPTION OF THE INVENTION

An improved method of authenticating a user using a TRT image is described herein. Although various embodiments are described with reference to a TRT image (visual presentation), it will be recognized that the description equally applies to other types of TRT's described above, e.g., audio and audio-visual. According to aspects of the present invention, an improved and more reliable authentication method is provided in part by creating a secured communication channel between a host system and a user system, utilizing TRT images in conjunction with other authenticating information to authenticate a user. The authentication may be accomplished prior to the user exchanging any sensitive information with the host system. Upon successful authentication, the user may be allowed to proceed with further communications with the host system.

Figure 1:
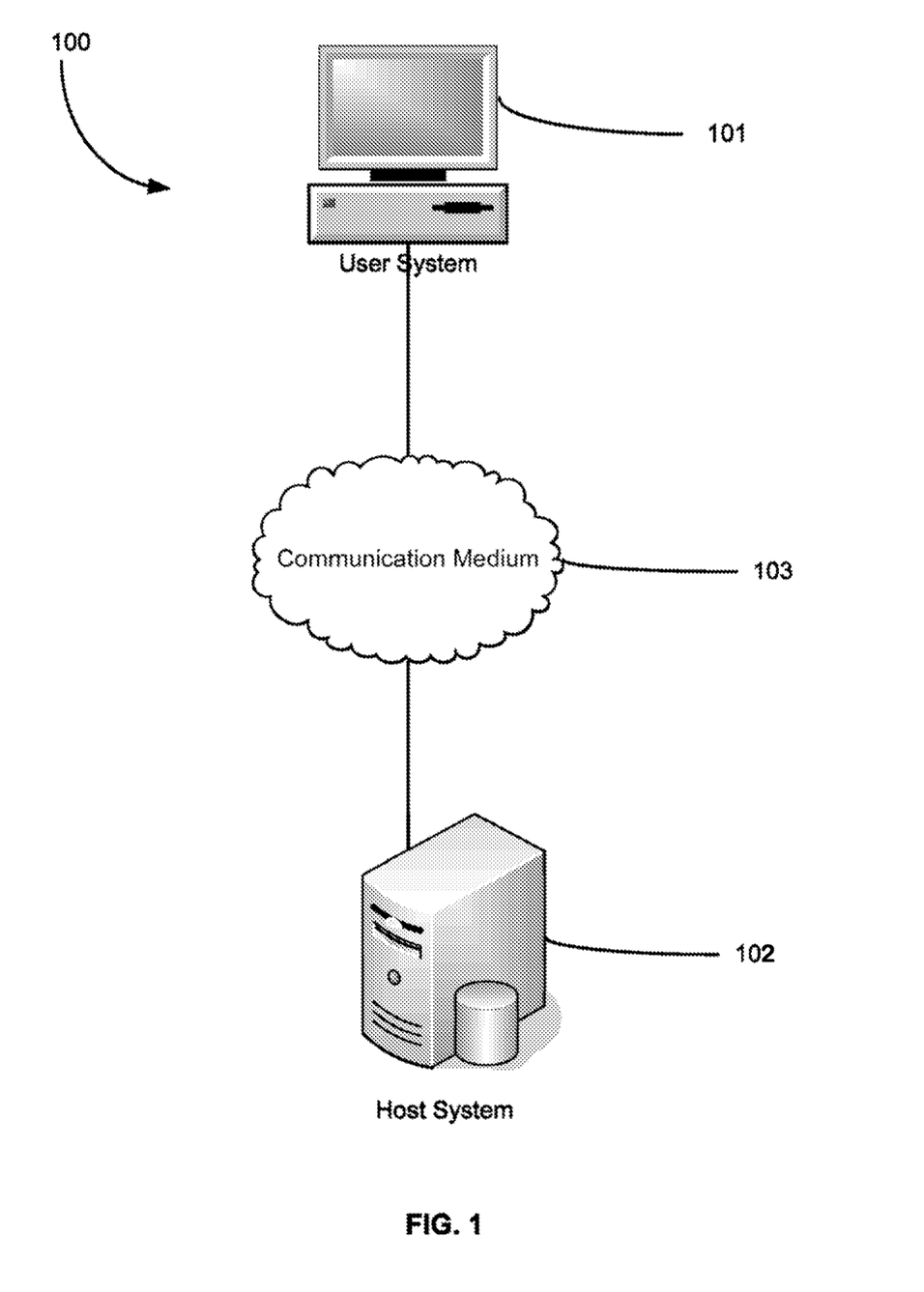
FIG. 1 is a high-level block diagram of an authenticating system according to an embodiment of the present invention.

FIG. 1 is a high-level block diagram showing the various broad hardware components of an authentication system 100 according to the present invention. As shown, system 100 comprises user system 101 coupled to Host system 102 through communication medium 103. The connections are typically TCP/IP (Transmission Control Protocol/Internet Protocol) connections, but other connections and protocols are also possible. For example, the connection between user system 101 and host system 102 might be a SLIP/PPP (Serial Link IP/Point-to-Point Protocol) connection, wireless connection, or the like.

In one embodiment, user system 101 may be a desktop computer configured to communicate to other computer systems over a plurality of communication mediums. Host system 102 may be a server, e.g., located at a financial institution. Communication medium 103 may be internet, wireless medium, wired connection, or the like.

In a secured environment, host system 102 can communicate with user system 101 without anyone eavesdropping or intercepting the communication between them. However, in certain instances, e.g., MITM, an attacker may insert an MITM system between the host system and the user system in order to gather sensitive information, as described above.

Embodiments of present invention may prevent or reduce such MITM attacks and other attempts to intercept and decipher communications between host system 102 and user system 101 by implementing an authentication process including a two-factor test. The two-factor test may include, as a first step, the host system 102 presenting the user, through user system 101, with a TRT image including transaction details entered previously by the user. The second step may require the user to verify the transaction details and provide textual confirmation including one or more items of information embedded in the TRT image back to the host system 102.

Figure 2:
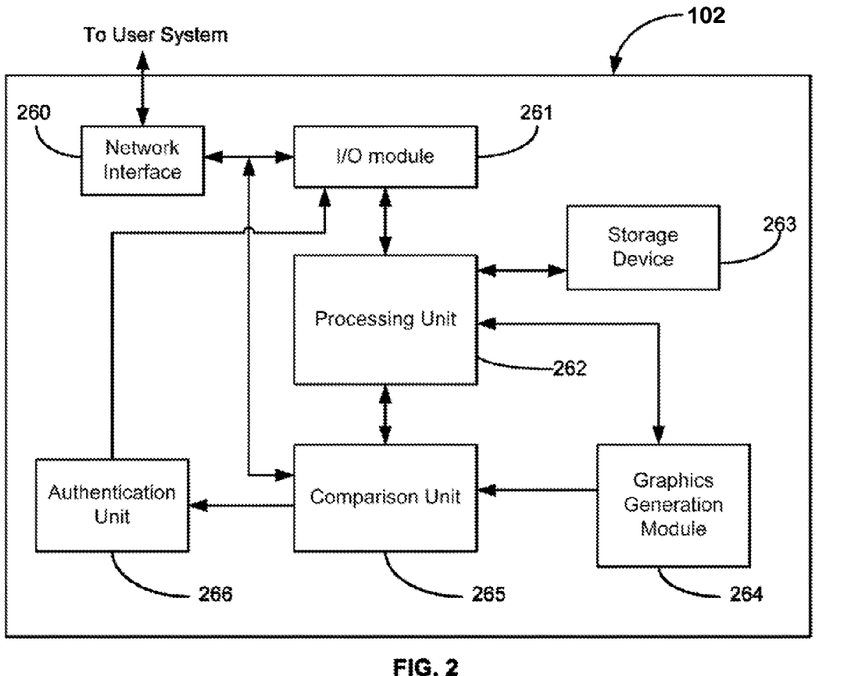
FIG. 2 is a block diagram illustrating a host system according to an embodiment of the present invention.

FIG. 2 illustrates a block diagram of the host system 102 according to one embodiment of the present invention. Host system 102 may include network interface module 260 that may be capable of communicating with user system 101 (as illustrated in FIG. 1). Network interface module 260 may be coupled to Input/Output (I/O) module 261. I/O module 261 may be configured to manage communications within host system 102, and may act as a gateway for commands and data being communicated to and received from the user system 101. Processing unit 262 may be configured to receive input from the user system 101 via I/O module 261. Processing unit 262 may be further configured to communicate information received from the user system 101 to graphics generation module 264. Processing unit 262 may be coupled to a storage device 263. Storage device 263 may store program instructions that can be executed by processing unit 262 in order to perform various tasks. Storage device 263 might be ROM (read only memory), RAM (random access memory), hard disk, other magnetic storage, optical storage, other storage or a combination or variation of these. In addition, processing unit 262 may be capable of generating a unique identifier associated with a particular transaction.

Graphics generation module 264 may be configured to create a text-reading test (TRT) image based at least in part on information about a transaction received from the processing unit 262. Comparison unit 265 may be coupled to the graphics generator 264, processing unit 262, and I/O module 261 and may receive user input via I/O module 261 and the TRT image from graphics generation module 264. Comparison unit 265 may be configured to compare the TRT image and the input from the user and output a signal. The comparison may be performed based on a programmable predetermined criterion. The output from comparison unit 265 may be a signal indicating a degree of correspondence between the two inputs, i.e., user input and TRT image. Authentication unit 266 may receive the output signal from graphics generation module 264, may determine whether to authenticate the user, based on one or more criteria, and may allow a transaction to proceed based on the determination. Authentication unit 266 may communicate its decision to the user system 101 via I/O module 261 and network interface 260. Host system 102 may be implemented using a general purpose computer, a server system, or the like.

Figure 3:
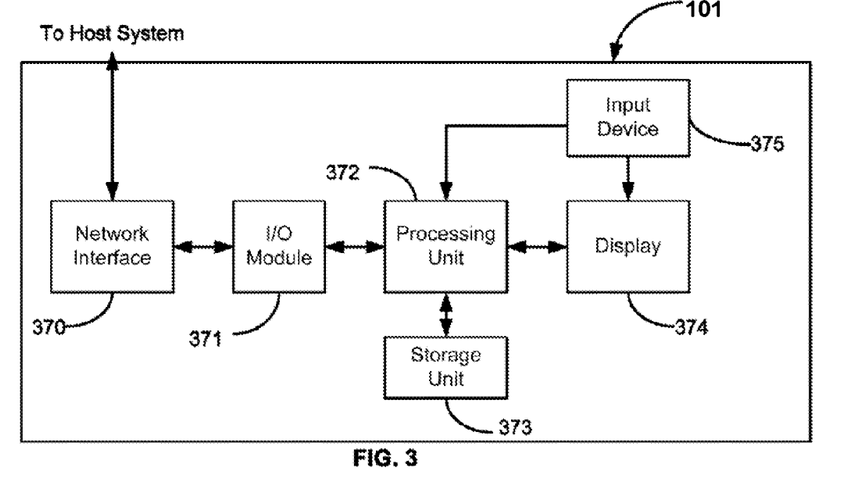
FIG. 3 is a block diagram illustrating a user system according to an embodiment of the present invention.

FIG. 3 illustrates a block diagram of user system 101. User system 101 may include network interface 370 coupled to I/O module 371. The functionality of network interface 370 and I/O module 371 may be similar to network interface 260 and I/O module 261 described above in connection with host system 102. Processing unit 372 may be coupled to storage unit 373 and display 374. Storage unit 373 may be similar to storage device 263 described above. Processing unit 372 may be configured to receive information, e.g., a TRT image, from the host system 102 and display it on display 374. Input device 375, e.g., a keyboard, may be coupled to display 374 and processing unit 372. Input device 375 may be used by a user to input textual information, which may be communicated to the host system 102 via network interface 370. User system 101 may be implemented using a general purpose computer, a handheld communication device, e.g., a cellular phone, or any other device that can be configured to perform the functions described above.

Further, while the host system and the user system are described herein with reference to particular blocks, it is to be understood that these blocks are defined for convenience of description and are not intended to imply a particular physical arrangement of component parts. Further, the blocks need not correspond to physically distinct components. Blocks may be configured to perform various operations, e.g., by programming a processor or providing appropriate control circuitry. Embodiments of the present invention can be realized in a variety of devices including electronic devices implemented using any combination of circuitry and software.

Figure 4:
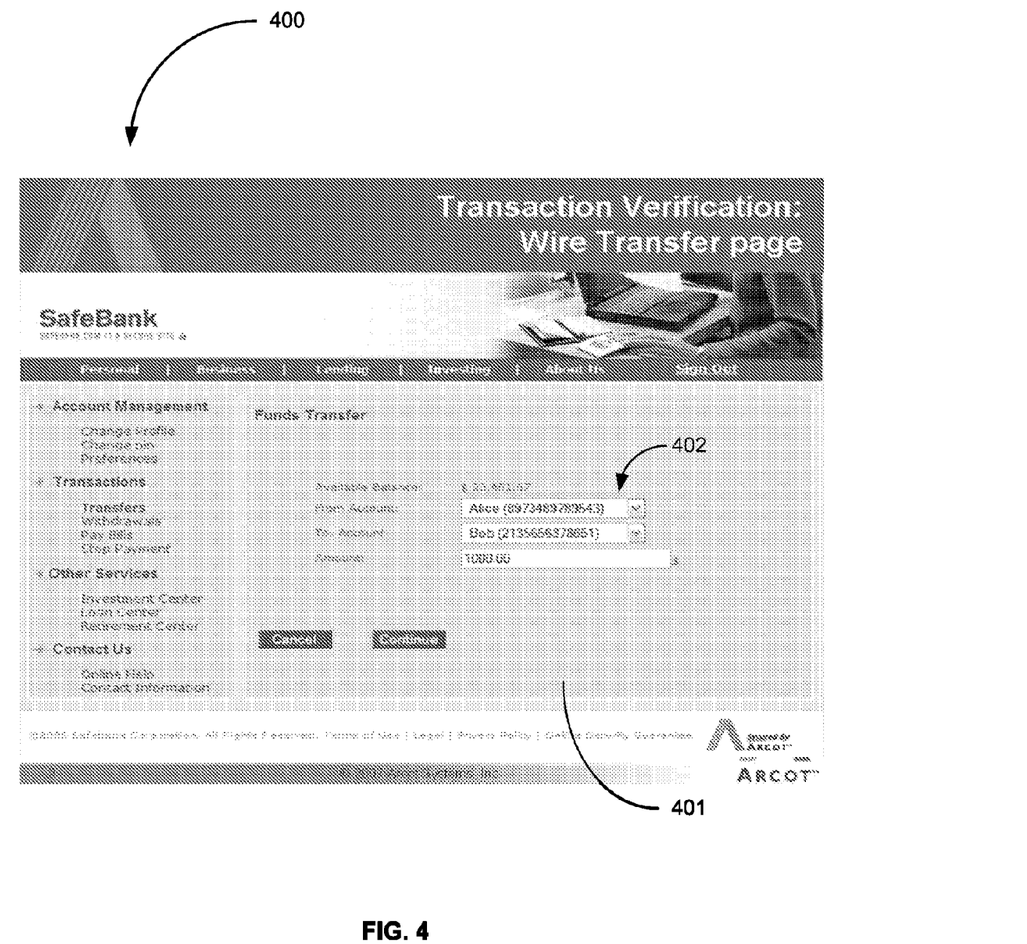
FIG. 4 is an illustration of a user transaction screen according to an embodiment of the present invention.

FIG. 4 illustrates transaction screen 400 that may be displayed on user system 101. A user may be required to establish communication with the host system 102 using pre-approved credentials, e.g., username and password, before being presented with transaction screen 400. Transaction screen 400 may include transaction entry section 401. Transaction entry section 401 may further include one or more locations 402 configured to accept input from a user. The input may include information related to a particular transaction that the user may intend to initiate, e.g., source and destination account numbers and the amount of transfer. Transaction screen 400 may be characterized by a webpage. Alternatively, transaction screen 400 may be provided by an application running on the user system 101. In addition, transaction screen 400 may include additional information pertaining to the user account, the details of which are not necessary to understand the present invention.

Figure 5:
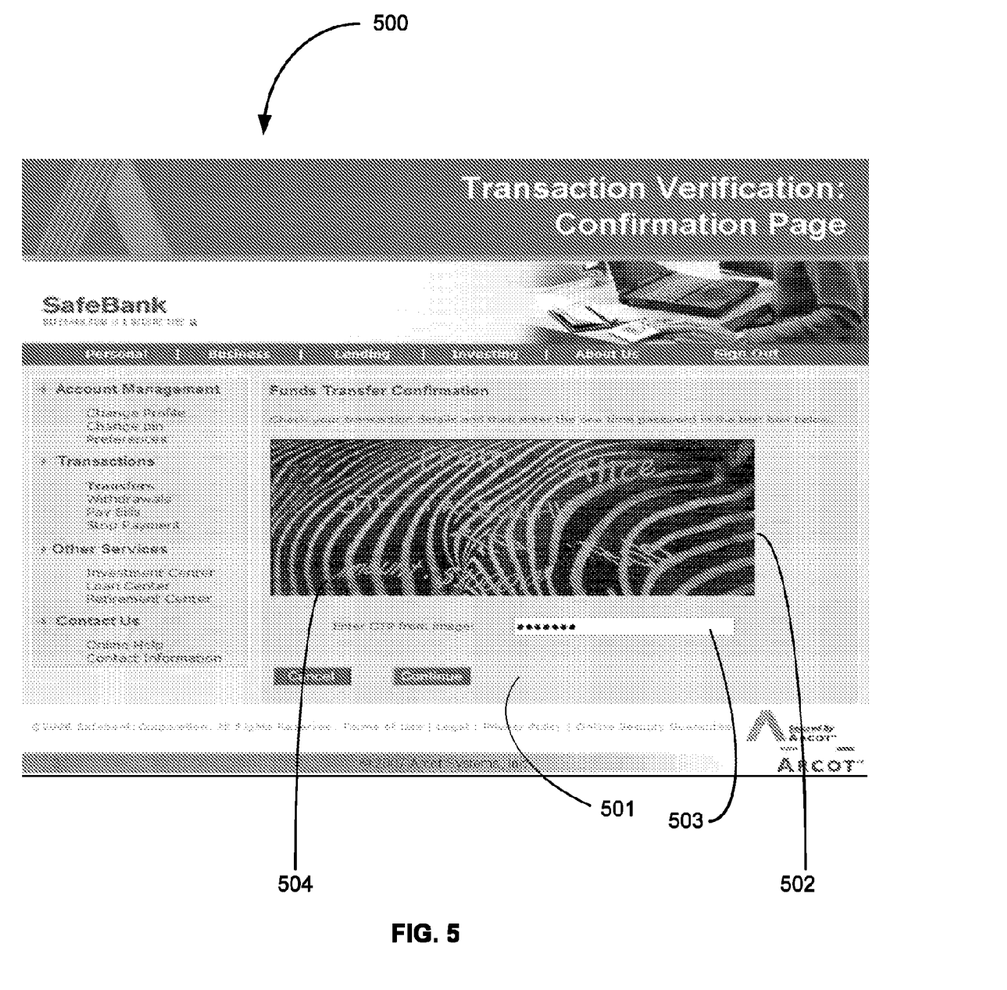
FIG. 5 is an illustration of a user interface screen including a TRT image according to an embodiment of the present invention.

FIG. 5 illustrates transaction confirmation screen 500 that may be displayed on the user system 101 after the user enters and submits transaction details using transaction screen 400 described above. Transaction confirmation screen 500 may include transaction verification section 501. Transaction verification section 501 may further include presentation display region 502 and user entry section 503. Presentation display region 502 may display TRT image 504, received from the host system 102. User entry section 503 may be configured to receive user input in a text format in response to a predetermined inquiry, e.g., "Enter OTP from image" as illustrated in FIG. 5. The inquiry related to user entry section 503 may be predetermined by the host system 102 or may be dynamic in that a different inquiry may be presented for each transaction. This may further serve to eliminate predictability of the response and make it more difficult for automated programs to predict and generate a response to the inquiry.

Figure 6:
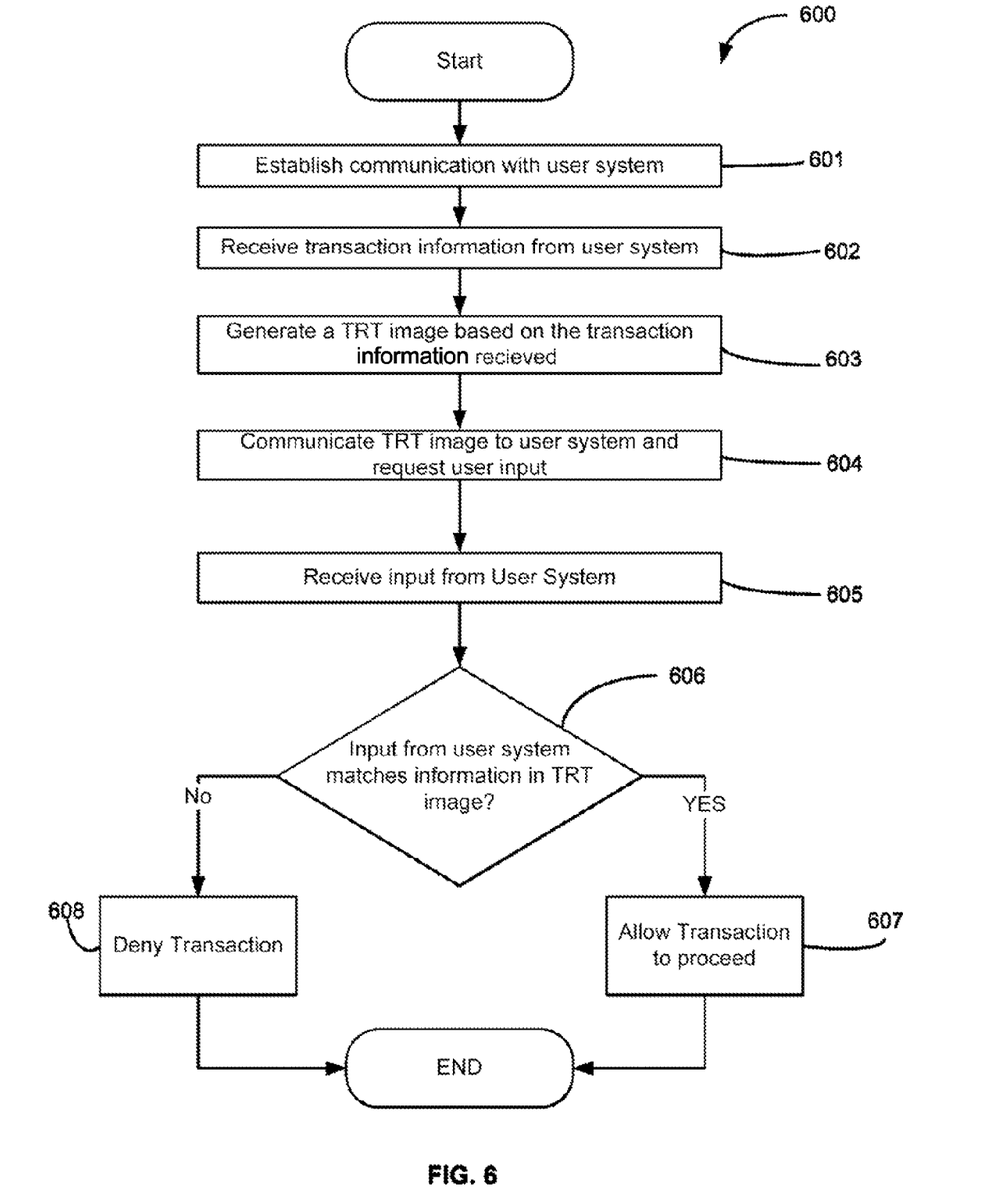
FIG. 6 illustrates a flow chart of a host-side authentication process according to an embodiment of the present invention.

FIG. 6 illustrates a flow chart of authentication process 600 according to an embodiment of the present invention. At step 601, the host system, e.g., a server located at a bank, may establish an initial communication link with a user system. This may include, for example, a user connecting, via the user system, to a bank website and logging into his/her account. At step 602, the host system may receive information related to a transaction initiated by a user. For example, a user may enter the information related to a transaction on transaction screen 600 described above.

At step 603, the host system may generate a TRT image. The TRT image may include a background image with all or part of the transaction details, received at step 602, embedded in it as distorted text. In addition, the host system may generate a one-time unique password for the current transaction. This one-time password may have a short life span, e.g., 1 minute, and may only be associated with the current transaction. The TRT image generated by the host system may include this one-time password, in addition to the transaction details discussed above. An example of TRT image generated by host system is illustrated in FIG. 5 (image 504).

At step 604, the host system may communicate the TRT image to the user system and request user input based on the TRT image. For example, the host may present the TRT image to the user on transaction confirmation screen 500 illustrated in FIG. 5. In one embodiment, the user may be asked to input the one-time password in user entry section 503. In other embodiments, user may be asked to provide any combination of information included in TRT image 504, e.g., one-time password and transaction amount etc. Moreover, the input requested from the user may be different for each transaction or even for iterations of the same transaction.

At step 605, the host system receives the input provided by the user, via the user system. The input from the user may be a textual response corresponding to the TRT image as described above. The host system may compare the input received from the user to the information in the TRT image at step 606. The comparison may be based on predetermined criteria, e.g., approximate match between user input and information in the TRT image or a perfect match between user input and information in the TRT image. The predetermined criteria may be programmable or fixed depending on the policies enacted at the host side. Other dynamic criteria may also be used to perform the comparison.

If, at step 606, the host system determines that the user input received at step 605 matches the information in TRT image based on the criteria used, the transaction is allowed to proceed (step 607). On the other hand, if the host system determines that the user input and information in the TRT image do not match, the transaction is denied at step 608 and an appropriate notification indicating the denial may be sent to the user system to be displayed to the user.

In an alternative embodiment, where a MITM modifies the information sent by the user system, the user can compare transaction information that he/she entered on transaction screen 400 with the information in the TRT image received from the host system. For example, if a user submits a transaction request "from A to B" on transaction screen 400, but the MITM modifies it to read "from A to B1" before sending it to the host system. The TRT image generated by the host system will include the incorrect transaction details, e.g., "from A to B1." This incorrect information may be presented to the user for confirmation, in step 604 above. The user can then recognize the mistake and cancel the transaction using transaction conformation screen 500. The communication involving sending the TRT image to the user system and receiving user input based on the TRT image may be performed in real-time. By performing this operation in real-time, it may require the MITM attacker to decipher the messages between the user system and the host system in real-time in order to prevent the user from detecting the data tampering. Thus, a secure communication channel between the user system and the host system may be realized.

In yet another embodiment, it may be possible to detect an MITM even before a transaction is initiated. According to this embodiment, after the initial communication has been established between the host system and the user system, the host system may send a TRT image including information such as, user location, user system IP address, hostname of the user system, and time zone of the user system as seen by the host system. The user may be required to confirm this information before any further exchange of information is allowed. If one or more of this information does not match with the actual user system information, the user and/or the host system may terminate the session. This scheme may detect any MITM not in the same geographical location and since IP address of each machine is different, it may be possible to detect an MITM before any sensitive information is exchanged between the host system and the user system.

As has now been explained, by using a TRT image and requesting confirmation of the contents in the TRT image from the user, it may be possible to eliminate attacks that use automated programs or MITM. In addition, the verification and confirmation may be done in a single session using a single communication channel thereby eliminating the need for out-of-band communication or the like.

One advantage of this technique is that it may offer protection against broad range of attacks, e.g., MITM, keylogger, Trojans, or the like. Another advantage of this technique is the reduction in cost and complexity associated with out-of-band communication method thereby increasing the user friendliness of the system incorporating this scheme. Yet another advantage of this technique is that since the implementation of this method is platform independent, it may be easier to deploy and use this method compared to other methods described above. Further, the TRT image can be implemented in any language and may also contain dynamic and/or non-textual content in addition to or instead of static content. This may further reduce the possibility of an automated program being able to decipher the contents of the TRT image while at the same time providing the flexibility of use in any system since the TRT image does not have any linguistic constraints. In addition, an advantage of the one-time password is that its relatively short life span may prevent any offline deciphering of the password, as the password is more likely to expire, making it unusable, before it is deciphered. In addition, use of one-time password may require the interaction of a user thereby eliminating programs like Quick Test Professional (QTP) that can be programmed to run multiple replays of password variations in a short period of time.

Further embodiments can be envisioned by one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

The invention claimed is:

1. A method for authenticating a transaction between a user system and a host system, the method comprising:
   sending, from the host system to the user system, a first text-reading test (TRT) image, the first TRT image comprising user system information as understood by the host system;
   receiving, from the user system, confirmation of whether the user system information matches actual user system information;
   terminating a session between the user system and the host system when the user system information as understood by the host system does not match the actual user system information;
   allowing the session to proceed when the user system information as understood by the host system matches the actual user system information, comprising:
      receiving, from the user system, information associated with the transaction;
      generating a time-limited one-time password (OTP) using the host system;
      processing the information associated with the transaction using the host system to transform the information into a second TRT image containing the OTP and details of the transaction, such that the OTP and the details are both embedded in the second TRT image as distorted text;
      sending, from the host system to the user system, the second TRT image in a format that is viewable by the user on the user system;
      receiving, from the user system, input verifying the OTP and the details in the second TRT image; and
      automatically authenticating the transaction using the host system based on the input from the user system.

2. The method of claim 1, wherein automatically authenticating the transaction comprises comparing the input received from the user system to the information included in the second TRT image using the host system; and
authenticating the transaction when the input from the user system corresponds to the details in the TRT image.

3. The method of claim 1, wherein the OTP associated with the transaction is time-limited to 1 minute or less.

4. The method of claim 1, wherein the second TRT image comprises an image embedded with text.

5. The method of claim 1, wherein the second TRT image comprises audio content.

6. The method of claim 1, wherein the second TRT image comprises audio-visual content.

7. The method of claim 1, wherein the second TRT image comprises dynamic content.

8. The method of claim 7, wherein the dynamic content comprises a moving image.

9. The method of claim 1, wherein the input from the user system comprises textual information.

10. The method of claim 1, wherein the user system information comprises an IP address that the host system understands to be the IP address of the user system.

11. The method of claim 1, wherein the user system information comprises a hostname that the host system understands to be the hostname of the user system.

12. The method of claim 1, wherein the user system information comprises a location that the host system understands to be the location of the user system.

13. The method of claim 1, wherein the first TRT image comprises the user system information as distorted text.

14. A method for authenticating a user during a transaction involving the user and a host system, the method comprising:
sending, from the host system to a user system, a first text-reading test (TRT) image, the first TRT image comprising user system information as seen by the host system, the user system information comprising one or more of a user system IP address as seen by the host system, a user system hostname as seen by the host system, or a user system location as seen by the host system;
receiving, from the user system, comfirmation of whether the user system information as seen by the host system matches actual user system information;
terminating a session between the user system and the host system when the user system information as seen by the host system does not match the actual user system information;
allowing the session to proceed when the user system information as seen by the host system matches the actual user system information, comprising the following:
using the host system to transform information relating to the transaction into a second TRT image, wherein the second TRT image is a CAPTCHA that includes a time-limited one-time password (OTP) and details of the transaction both as distorted text;
sending the second TRT image from the host system to the user system that is accessible by the user in a format that is viewable by the user via the user system;
receiving text input from the user corresponding to the OTP and the details of the transaction in the second TRT image;
comparing the text input received from the user to the second TRT image using a comparison unit of the host system; and
authenticating the user if the text corresponds to the second TRT image.

15. The method of claim 14, wherein comparing comprises use of a criterion.

16. The method of claim 14, wherein the second TRT image is characterized by an image embedded with text.

17. A host system for conducting a transaction with a user system, comprising:
a storage device that stores program instructions; and
a processing unit coupled to the storage device, when the processing unit executes the program instructions, the processing unit:
sends a first text-reading test (TRT) image to the user system, the first TRT image comprising user system information as understood by the host system;
receives, from the user system, confirmation of whether the user system information as understood by the host system matches actual user system information;
terminates a session between the user system and the host system when the confirmation from the user indicates that the user system information as understood by the host system does not match the actual user system information;
allows the session to proceed when the confirmation from the user indicates that the user system information as understood by the host system matches the actual user system information, when the processing unit allows the session the processing unit:
receives, from the user system, information associated with the transaction;
generates a time-limited one-time password (OTP) using the host system;
processes the information associated with the transaction using the host system to transform the information into a second TRT image containing the OTP and details of the transaction, such that the OTP and the details are both embedded in the second TRT image as distorted text;
sends, from the host system to the user system, the second TRT image in a format that is viewable by the user on the user system;
receives, from the user system, input verifying the OTP and the details in the second TRT image; and
automatically authenticates the transaction using the host system based on the input from the user system.

18. The system of claim 17, wherein the user system information comprises an IP address that the host system understands to be the IP address of the user system.

19. The system of claim 17, wherein the user system information comprises a hostname that the host system understands to be the hostname of the user system.

20. The system of claim 17, wherein the user system information comprises a location that the host system understands to be the location of the user system.

* * * * *